United States Patent
Chen et al.

(10) Patent No.: US 8,184,144 B2
(45) Date of Patent: May 22, 2012

(54) METHOD OF CALIBRATING INTERIOR AND EXTERIOR ORIENTATION PARAMETERS

(75) Inventors: Chi-Farn Chen, Taipei (TW); Li-Yu Chang, Pingjhen (TW); Su-Rung Yang, Gueishan Township (TW)

(73) Assignee: National Central University, Jhongli (TW)

( * ) Notice: Subject to any disclaimer, the term of this patent is extended or adjusted under 35 U.S.C. 154(b) by 565 days.

(21) Appl. No.: 12/505,518

(22) Filed: Jul. 19, 2009

(65) Prior Publication Data

US 2010/0289869 A1 Nov. 18, 2010

(30) Foreign Application Priority Data

May 14, 2009 (TW) .............................. 98115992 A

(51) Int. Cl.
*H04L 7/00* (2006.01)

(52) U.S. Cl. .......... 348/36; 348/187; 348/427; 348/135; 348/144; 348/47; 382/285; 382/154; 382/289; 382/294; 382/296; 345/421; 345/582; 345/653; 345/654; 396/7; 396/8; 396/9; 396/10; 396/11; 396/13; 356/2

(58) Field of Classification Search .................... 348/36, 348/47, 144, 187, 135, 427; 382/285, 289, 382/294, 296, 154; 345/421, 582, 653–654; 396/7–11, 13; 356/2
See application file for complete search history.

(56) References Cited

U.S. PATENT DOCUMENTS

| | | | | |
|---|---|---|---|---|
| 7,509,241 B2* | 3/2009 | Guo et al. ......................... 703/2 | | |
| 2002/0136444 A1* | 9/2002 | Brown et al. .................. 382/154 | | |
| 2003/0014224 A1* | 1/2003 | Guo et al. ......................... 703/1 | | |
| 2003/0044085 A1* | 3/2003 | Dial et al. ..................... 382/293 | | |
| 2003/0202089 A1* | 10/2003 | Alhadef et al. .................. 348/42 | | |
| 2004/0131248 A1* | 7/2004 | Ito et al. ......................... 382/154 | | |
| 2004/0233461 A1* | 11/2004 | Armstrong et al. ........... 356/620 | | |
| 2005/0031197 A1* | 2/2005 | Knopp .......................... 382/154 | | |
| 2005/0069195 A1* | 3/2005 | Uezono et al. ................ 382/154 | | |
| 2005/0117215 A1* | 6/2005 | Lange ........................... 359/462 | | |
| 2005/0261849 A1* | 11/2005 | Kochi et al. ..................... 702/85 | | |
| 2007/0269102 A1* | 11/2007 | Wang ............................ 382/154 | | |
| 2008/0279447 A1* | 11/2008 | Friedlander et al. .......... 382/154 | | |
| 2009/0087013 A1* | 4/2009 | Westrick ....................... 382/100 | | |
| 2009/0096790 A1* | 4/2009 | Wiedemann et al. ......... 345/427 | | |
| 2009/0154793 A1* | 6/2009 | Shin et al. ..................... 382/154 | | |
| 2010/0085423 A1* | 4/2010 | Lange ............................. 348/46 | | |
| 2010/0098293 A1* | 4/2010 | Chandraker et al. .......... 382/103 | | |
| 2010/0232638 A1* | 9/2010 | Leprince et al. .............. 382/100 | | |
| 2010/0322482 A1* | 12/2010 | Kochi et al. ................... 382/106 | | |
| 2011/0096957 A1* | 4/2011 | Anai et al. .................... 382/106 | | |

(Continued)

OTHER PUBLICATIONS

Habib et al., "Quantitative Measures For The Evaluation of Camera Stability," Department of Geomatics Engineering, University of Calgary, TS-PS: Working Group I/2 Sensor Calibration and Testing, printed Mar. 2012.*

(Continued)

*Primary Examiner* — Alina N. Boutah
(74) *Attorney, Agent, or Firm* — Jackson IPG PLLC; Demian k. Jackson

(57) ABSTRACT

The present invention calibrates interior orientation parameters (IOP) and exterior orientation parameters (EOP). With the calibrated IOPs and EOPs, a remotely controlled camera can quickly obtains corresponding IOPs and EOPs no matter on panning, tilting or zooming. Thus, the remotely controlled camera obtains accuracies on imaging and measuring and obtains wide applications.

10 Claims, 12 Drawing Sheets

U.S. PATENT DOCUMENTS

2012/0062868 A1* 3/2012 Kludas et al. ............ 356/4.01

OTHER PUBLICATIONS

"Least Squares 3D Surface Matching," Institut fur Geodasie und Photogrammetrie an der Eidgenossischen Technischen Hochschule Zurich, Mitteilungen Nr. 92, Zurich, 2007.*

Xie et al., "Multi-Image Based Camera Calibration Without Control Points," PS WG V/1, printed Mar. 2012.*

Aoyama et al. "Efficient Calibration of Amateur Digital Camera and Orientation for Photogrammetric Applications," Tokyo Denki University, Department of Civil and Environmental Engineering, Commission Youth Forum, printed Mar. 2012.*

Habib et al., "Stability Analysis and Geometric Calibration of Off-the-Shelf Digital Cameras," Department of Geomatics Engineering, University of Calgary, Photogrammetric Engineering & Remote Sensing, Jun. 2005.*

Chen et al., "A Rigorous Laboratory Calibration Method for Interior Orientation of an Airborne Linear Push-Broom Camera," Photoprammetric Engineering & Remote Sensing, Apr. 2007.*

Wu et al., "Calibration of Small and Low-Cost UAV Video System for Real-Time Planimetric Mapping," Laboratory for Earth Observation and Informatics, Old Dominion University, Norfolk, VA, printed Mar. 2012.*

Konrad Schindler, "Introduction to Photogrammetry," Institute of Geodesy and Photogrammetry, ETH Zurich, printed Mar. 2012.*

Dial et al., "RPC Replacement Camera Models," The International Archives of the Photogrammetry, Remote Sensing and Spatial Information Sciences, vol. 34, printed Mar. 2012.*

Birch, Jason, "Using 3DM Analyst Mine Mapping Suite for Rock Face Characterisation," ADAM Technology, 2006.*

Habib et al., "Quantitative Measures of the Evaluation of Camera Stability," University of Calgary Department of Geomatics Enginering, Optical Engineering, Mar. 2005.*

Guarnieri et al., "Photogrammetry and Ground-Based Laser Scanning: Assessment of Metric Accuracy of the 3D Model of Pozzoveggiani Church," May 22-27, 2004—FIG Working Week 2004, Athens, Greece.*

Chen et al., "Geometric Calibration of a PTZ Camera," Center for Space and Remote Sensing Research, printed Mar. 2012.*

* cited by examiner

METHOD OF CALIBRATING INTERIOR AND EXTERIOR ORIENTATION PARAMETERS

FIELD OF THE INVENTION

The present invention relates to orientation parameters; more particularly, relates to calibrating interior orientation parameters (IOP) and exterior orientation parameters (EOP) of a remotely controlled camera so that every zoom scale at every rotation angle has its corresponding IOPs and EOPs to obtain accuracies on imaging and measuring and to further obtain wide applications.

DESCRIPTION OF THE RELATED ART

A remotely controlled camera has functions of panning, tilting and zooming. In related art, to calculate accuracies of the remotely controlled camera on imaging and measuring, the following assumptions of calibration are set:

(a) While two rotation axes are assumed to be orthogonal and their intersection point is at rotation center, their center is assumed to be overlapped with the center of projection and the calibration of EOPs is not related to rotations of the two axes.

(b) While two rotation axes are assumed to be orthogonal and their intersection point is at rotation center, their center is assumed to be not overlapped with the center of projection and there is a distance between its center and the center of projection; and EOPs of the remotely controlled camera are calibrated with this assumption.

Since details of the geometric structure of the remotely controlled camera are usually unknown to user, calibration is hard to be modeled according to the geometric structure of the rotation axes. Furthermore, no matter the rotation axes are orthogonal and its center is overlapped or not with the center of projection, it is usually not possible to know how the rotation axes change the EOPs and how geometric accuracy is thus affected. Hence, the prior art does not fulfill all users' requests on actual use.

SUMMARY OF THE INVENTION

The main purpose of the present invention is to calibrate IOPs and EOPs for improving accuracies of a remotely controlled camera on imaging and measuring.

To achieve the above purpose, the present invention is a method of calibrating interior and exterior orientation parameters for a remotely controlled camera, comprising steps of calibrating IOPs of a remotely controlled camera at different zoom scales to build a relation between the IOPs and the zoom scales; and calibrating EOPs following changes of different rotation angles of different rotation axes to obtain curve surfaces of EOPs for the rotation angles. Accordingly, a novel method of calibrating interior and exterior orientation parameters is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
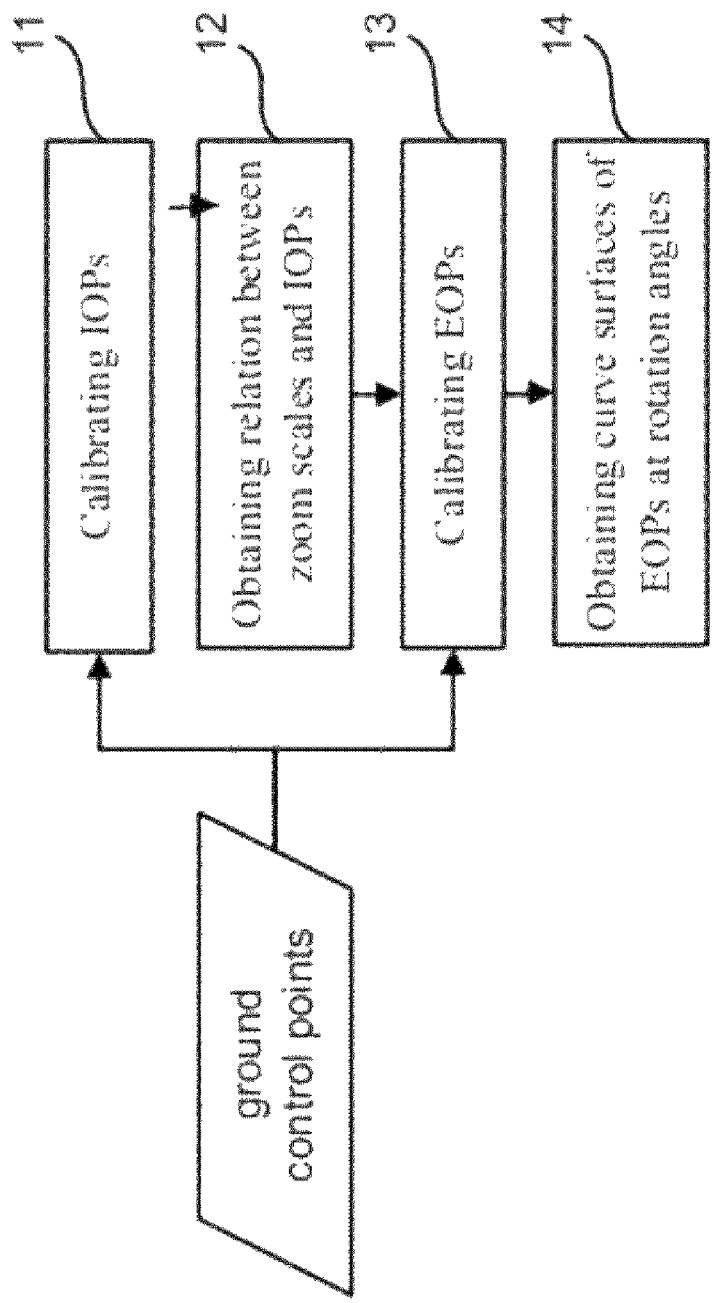
FIG. 1 is the flow view showing the preferred embodiment according to the present invention.
Figure 2:
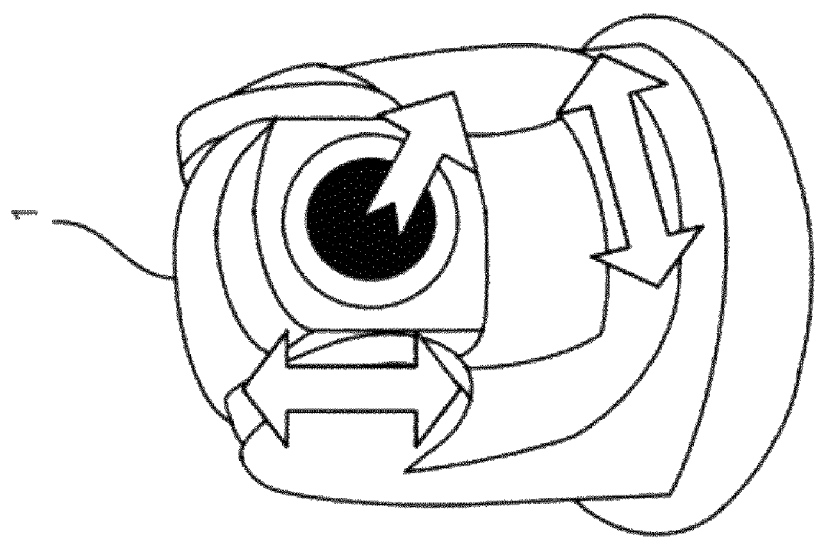
FIG. 2 is the view showing the remotely controlled camera.
Figure 3A:
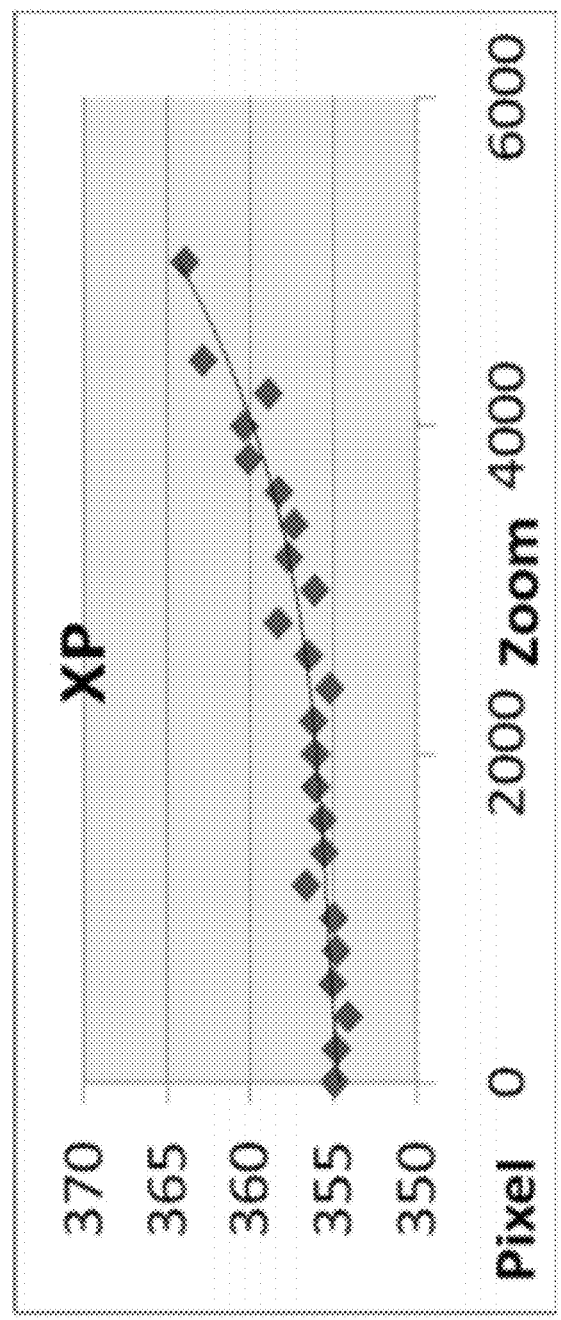
FIG. 3A and FIG. 3B are the views showing the coordinates of xp and yp of the principal points.
Figure 3B:
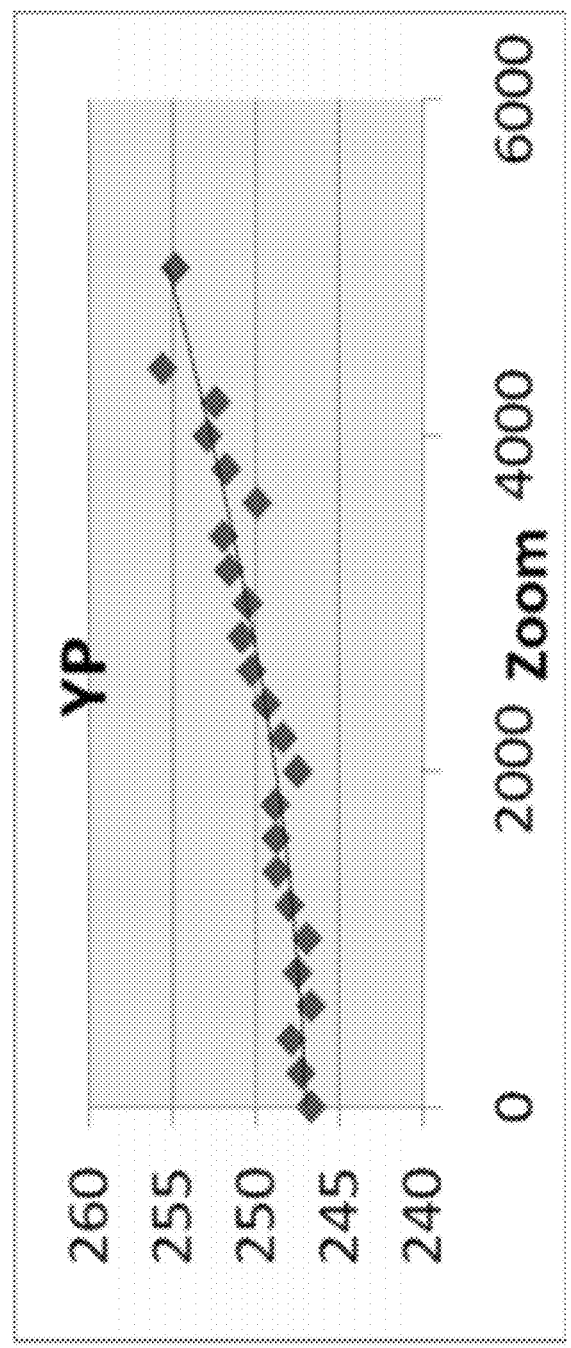
Figure 4A:
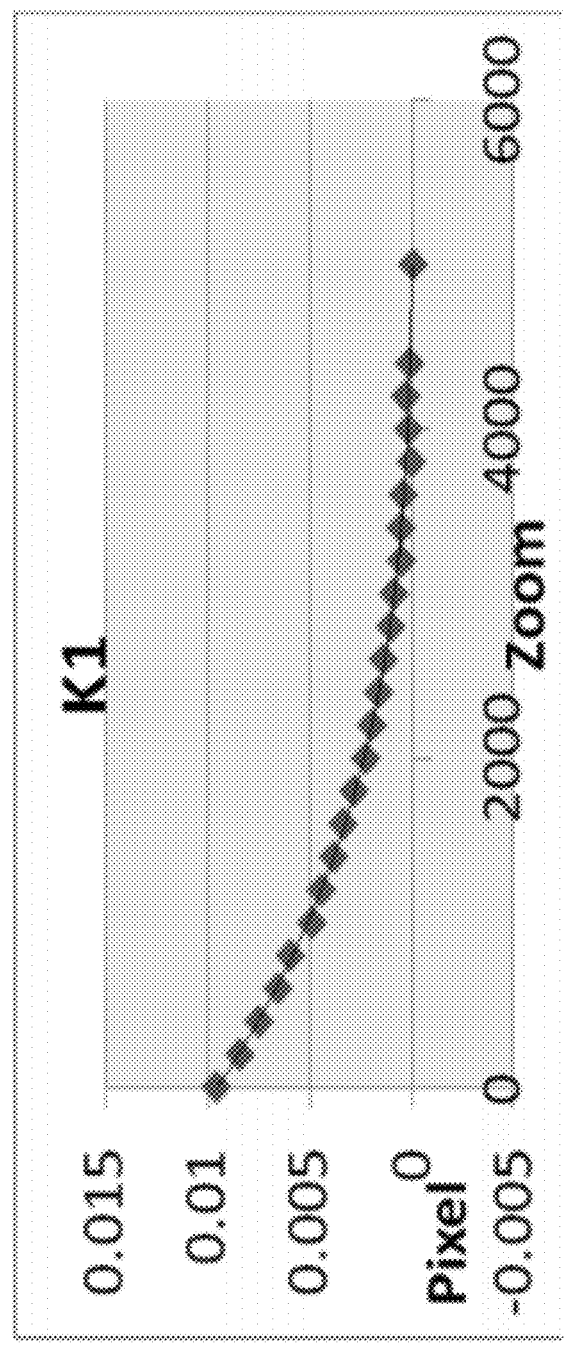
FIG. 4A and FIG. 4B are the views showing the lens distortion parameters of k1 and k2.
Figure 4B:
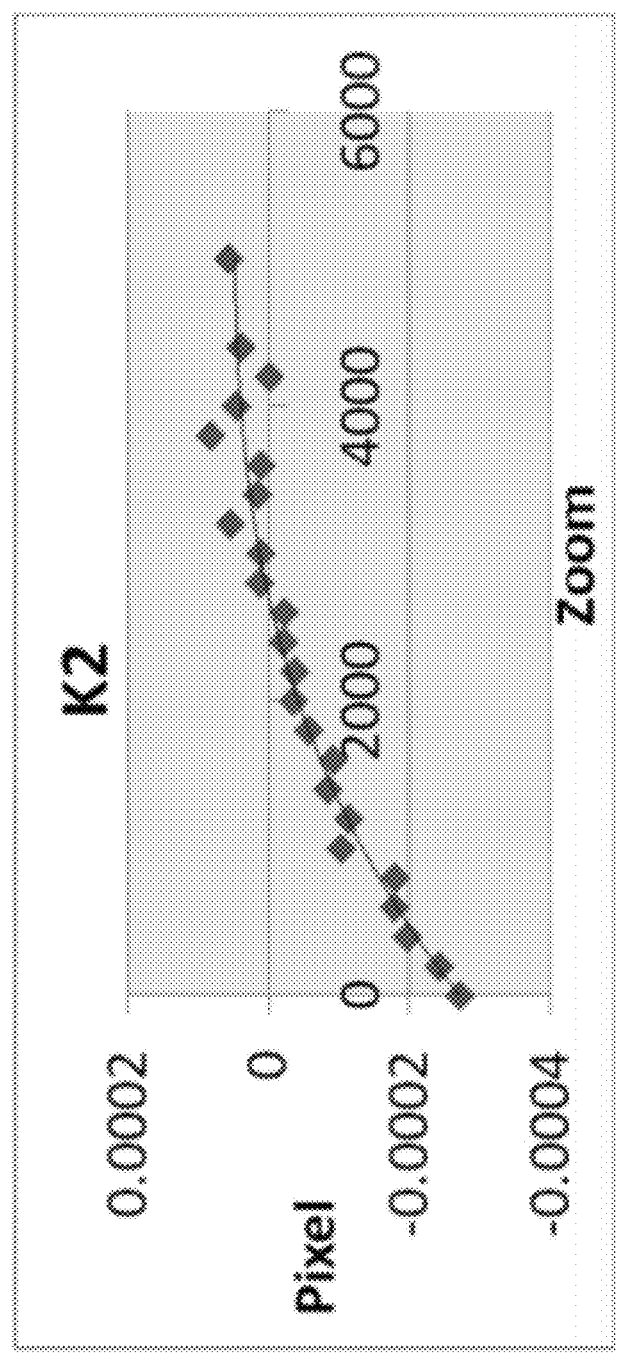
Figure 5:
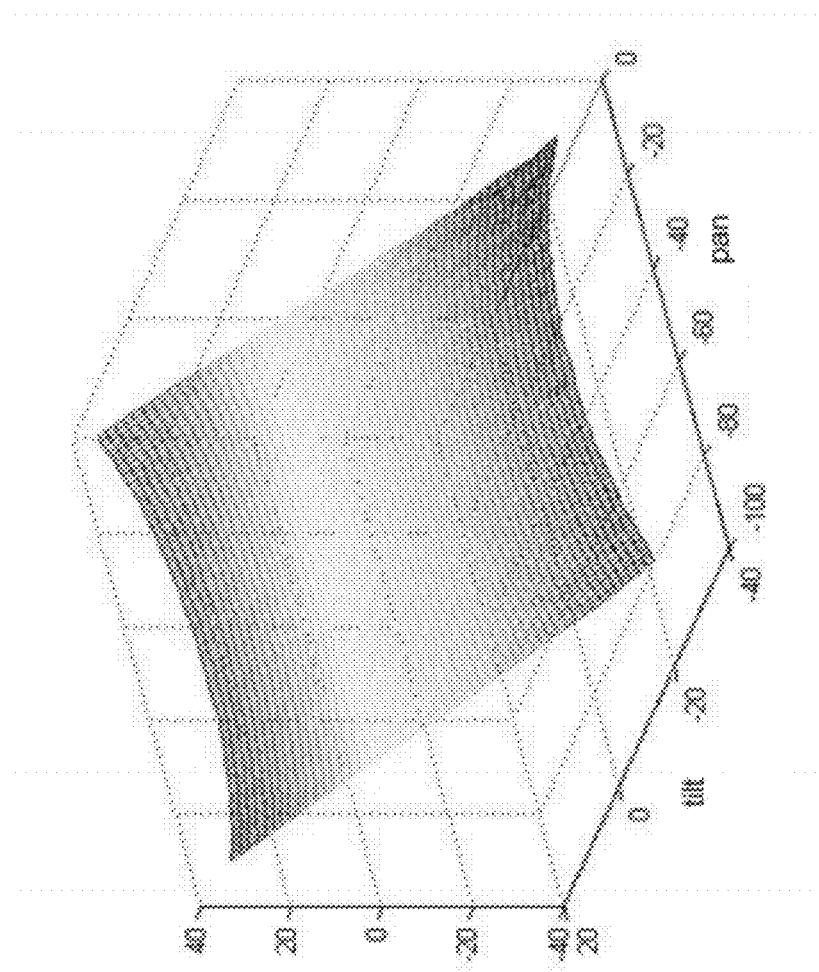
FIG. 5 to FIG. 7 are the views showing the curve surfaces of the orientations parameters of $\omega$, $\phi$ and $\kappa$.
Figure 6:
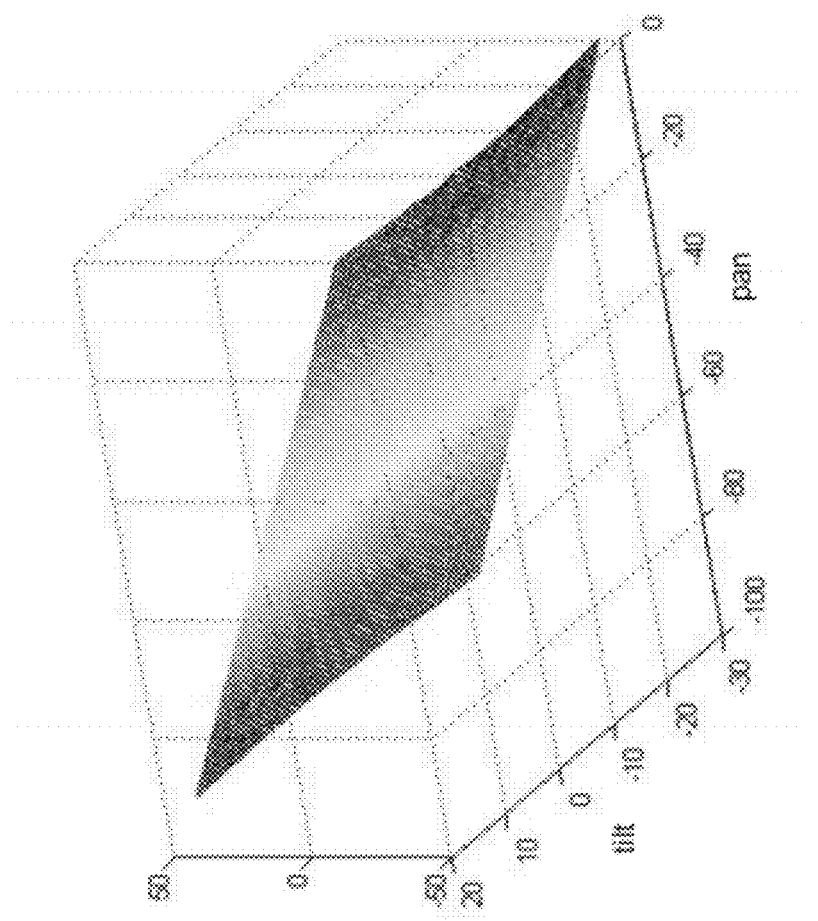
Figure 7:
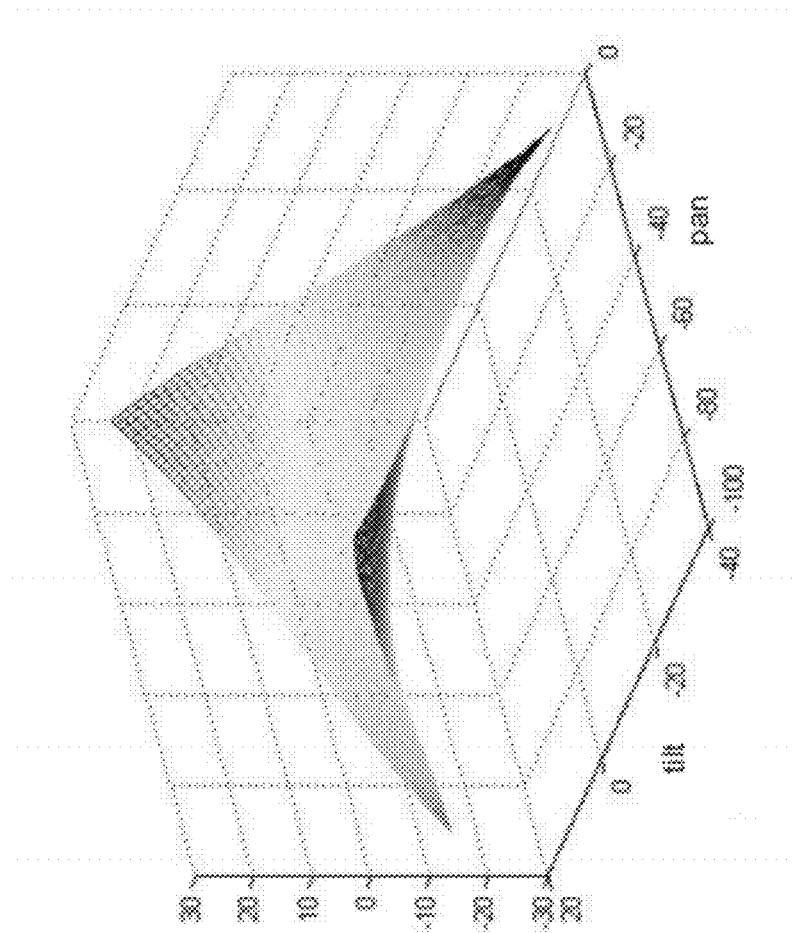
Figure 8:
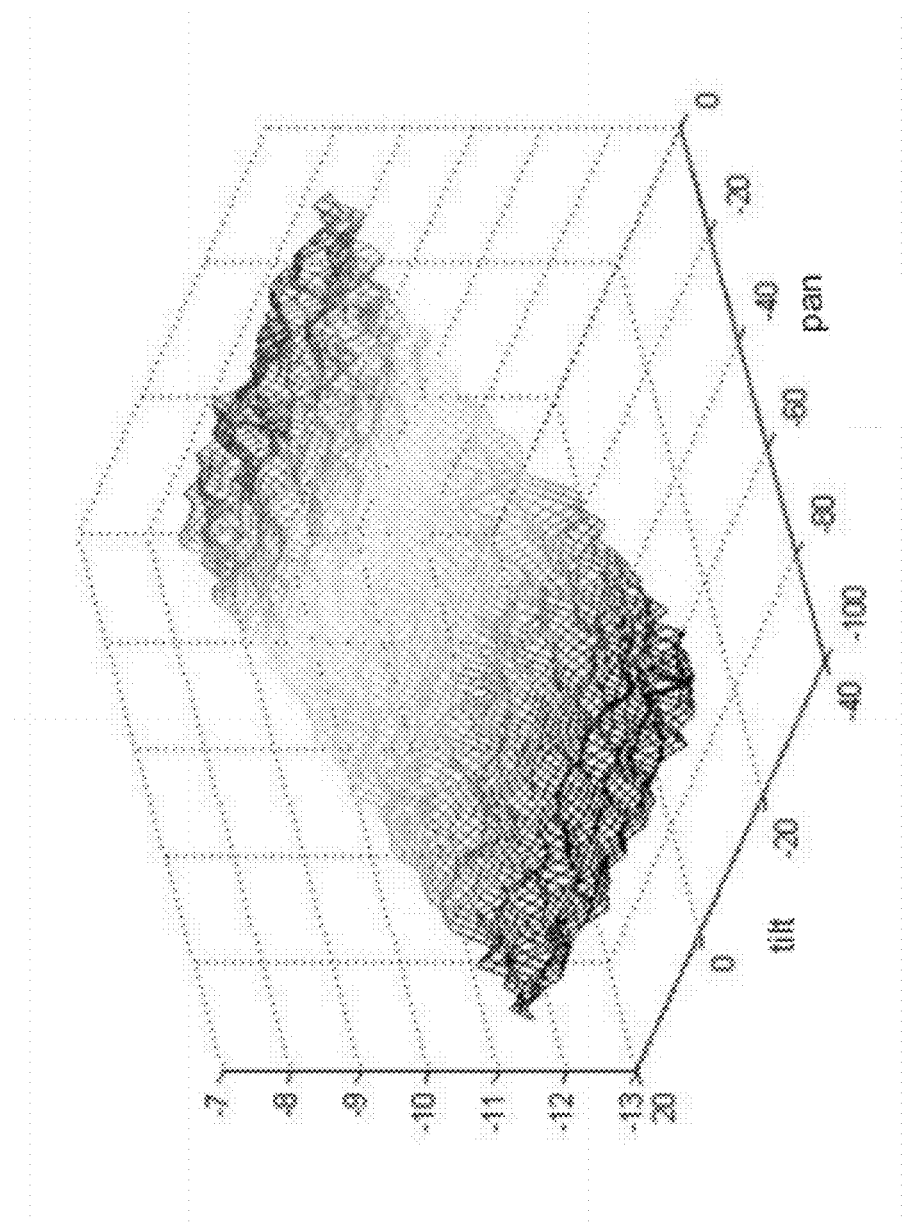
FIG. 8 to FIG. 10 are the views showing the curve surfaces of the position coordinates of XC, YC and ZC.
Figure 9:
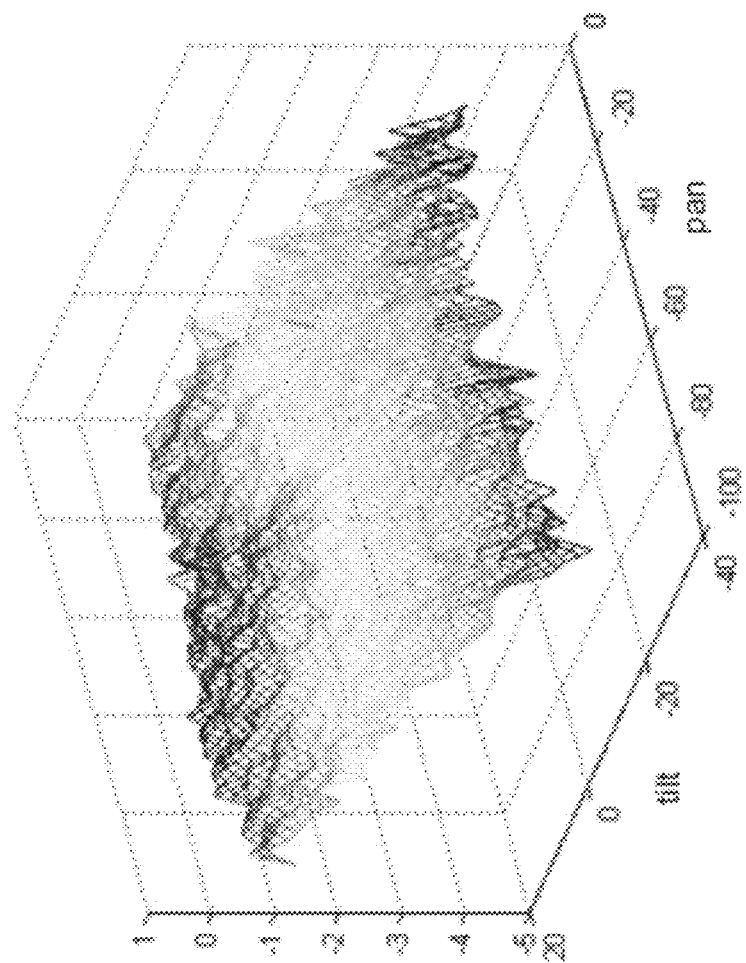
Figure 10:
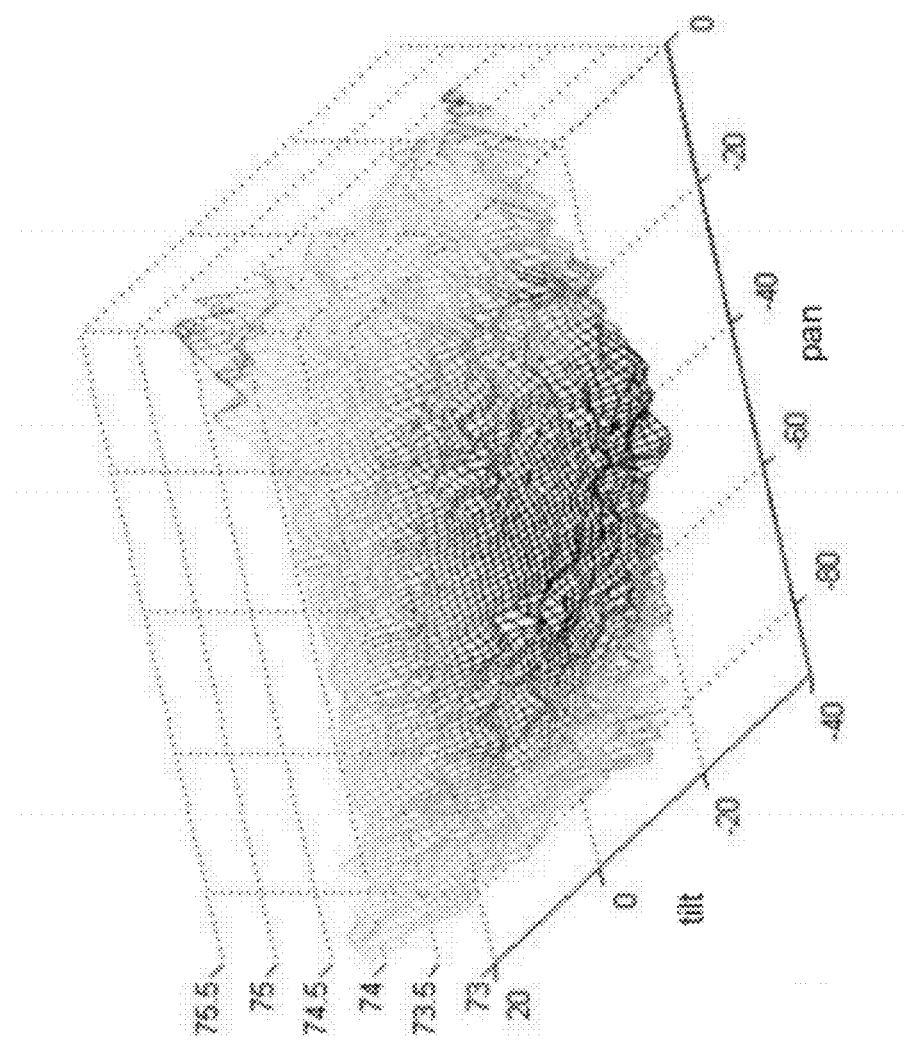

Please refer to FIG. 1 to FIG. 10, which are a flow view showing a preferred embodiment according to the present invention; a view showing a remotely controlled camera; views showing coordinates of xp and yp of principal points; views showing lens distortion parameters of k1 and k2; views showing curve surfaces of orientations parameters of $\omega$, $\phi$ and $\kappa$; and views showing curve surfaces of position coordinates of XC, YC and ZC. As shown in figures, the present invention is a method of calibrating interior and exterior orientation parameters for a remotely controlled camera, where a remotely controlled camera 1 is used. The remotely controlled camera 1 is a panoramic camera having functions of panning, tilting and zooming. At first, the remotely controlled camera 1 is fixed at a rotation angle to calibrate interior orientation parameters (IOP) at different zoom scales; then, exterior orientation parameters (EOP) are calibrated for different rotation angles. The present invention comprises the following steps:

(a) Calibrating IOPs 11: Regarding the zooming function of the remotely controlled camera 1, IOPs to be calibrated is set as additional parameters. By turning the remotely controlled camera 1 to a fixed rotation angle, all images of an object in a 3-dimensional (3D) object space are obtained on 2-dimensional (2D) image spaces through perspective projection by the remotely controlled camera 1. Based on first collinearity equations of F(1) with the additional parameters, coordinates of known ground control points on the 2D image spaces and corresponding coordinates of the same ground control points in the 3D object space are combined to calibrate the IOPs through self calibration bundle adjustment for different zoom scales. Thus, the IOPs of the remotely controlled camera 1, comprising coordinates of a principal point and corresponding lens distortion parameters, are calibrated through the following first collinearity equations:

$$x_a - x_p + \delta_x = -f\frac{m_{11}(X_A - X_C) + m_{12}(Y_A - Y_C) + m_{13}(Z_A - Z_C)}{m_{31}(X_A - X_C) + m_{32}(Y_A - Y_C) + m_{33}(Z_A - Z_C)} \quad F(1)$$

$$y_a - y_p + \delta_y = -f\frac{m_{21}(X_A - X_C) + m_{22}(Y_A - Y_C) + m_{23}(Z_A - Z_C)}{m_{31}(X_A - X_C) + m_{32}(Y_A - Y_C) + m_{33}(Z_A - Z_C)}$$

$$\begin{cases} \delta_x = x_a(k_1 r^2 + k_2 r^4) \\ \delta_y = y_a(k_1 r^2 + k_2 r^4) \end{cases}$$

$$r = \sqrt{(x_a - x_p)^2 + (y_a - y_p)^2}$$

$$m_{11} = \cos(\varphi)\cos(\kappa)$$

$$m_{12} = \sin(\omega)\sin(\varphi)\cos(\kappa) + \cos(\omega)\sin(\kappa)$$

$$m_{13} = -\cos(\omega)\sin(\varphi)\cos(\kappa) + \sin(\omega)\sin(\kappa)$$

$$m_{21} = -\cos(\varphi)\sin(\kappa)$$

$$m_{22} = -\sin(\omega)\sin(\varphi)\sin(\kappa) + \cos(\omega)\cos(\kappa)$$

-continued $$m_{23} = \cos(\omega)\sin(\varphi)\sin(\kappa) + \sin(\omega)\cos(\kappa)$$

$$m_{31} = \sin(\varphi)$$

$$m_{32} = -\sin(\omega)\cos(\varphi)$$

$$m_{33} = \cos(\omega)\cos(\varphi)$$

Therein, xa and ya are coordinates of a ground control point on the 2D image space; δx and δy are components of lens distortion parameters at x axis and y axis respectively; k1 and k2 are the lens distortion parameters; f is a focal length on imaging; xp and yp are coordinates of a principal point; the principal point is a cross point of a collimation line and the 2D image space; XA, YA and ZA are corresponding coordinates of the ground control point in the 3D object space; XC, YC and ZC are 3D coordinates of a center of perspectivity; m11 to m33 are elements of a matrix of orientation angles of ω, φ and κ; ω, φ and κ are rotation angles at x axis, y axis and z axis respectively; and xp, yp, k1 and k2 are the IOPs to be calibrated.

(b) Obtaining relation between zoom scales and IOPs 12: In FIG. 3A to FIG. 4B, polynomial corresponding equations of F(2) are figured out with the calibrated IOPs at the different zoom scales, where each of the zoom scales of the remotely controlled camera 1 has corresponding IOPs. The polynomial corresponding equations are as follows:

$$\begin{cases} f = a_1 + a_2 \times \text{zoom} + a_3 \times \text{zoom}^2 + K \\ x_p = b_1 + b_2 \times \text{zoom} + b_3 \times \text{zoom}^2 + K \\ y_p = c_1 + c_2 \times \text{zoom} + c_3 \times \text{zoom}^2 + K \\ k_1 = d_1 + d_2 \times \text{zoom} + d_3 \times \text{zoom}^2 + K \\ k_2 = e_1 + e_2 \times \text{zoom} + e_3 \times \text{zoom}^2 + K \end{cases} \quad F(2)$$

Therein, f is a focal length; $x_p$ and $y_p$ are coordinates of a principal point; k1 and k2 are lens distortion parameters; a to e are coefficients of the polynomial corresponding equations; and zoom is a zoom scale.

(c) Calibrating EOPs 13: Regarding the panning and tilting functions of the remotely controlled camera 1, the remotely controlled camera 1 is turned at a panning angle and a tilting angle. The rotation angle of the panning angle and the tilting angle are used as additional parameters of EOPs. The calibrated IOPs are combined to obtain coordinates of ground control points on 2D image spaces at different rotation angles and corresponding coordinates of the ground control points in a 3D object space at the rotation angles for calibrating EOPs by solving second collinearity equations of F(3) through resection method, where the EOPs comprises position coordinates and corresponding orientations. The second collinearity equations are as follows:

$$x_a - x_p + \delta_x = -f \frac{M_{11}(X_A - X_{C(p,t)}) + M_{12}(Y_A - Y_{C(p,t)}) + M_{13}(Z_A - Z_{C(p,t)})}{M_{31}(X_A - X_{C(p,t)}) + M_{32}(Y_A - Y_{C(p,t)}) + M_{33}(Z_A - Z_{C(p,t)})} \quad F(3)$$

$$y_a - y_p + \delta_y = -f \frac{M_{21}(X_A - X_{C(p,t)}) + M_{22}(Y_A - Y_C) + M_{23}(Z_A - Z_{C(p,t)})}{M_{31}(X_A - X_{C(p,t)}) + M_{32}(Y_A - Y_{C(p,t)}) + M_{33}(Z_A - Z_{C(p,t)})}$$

$$M_{11} = \cos(\varphi_{(p,t)})\cos(\kappa_{(p,t)})$$

$$M_{12} = \sin(\omega_{(p,t)})\sin(\varphi_{(p,t)})\cos(\kappa_{(p,t)}) + \cos(\omega_{(p,t)})\sin(\kappa_{(p,t)})$$

$$M_{13} = -\cos(\omega_{(p,t)})\sin(\varphi_{(p,t)})\cos(\kappa_{(p,t)}) + \sin(\omega_{(p,t)})\sin(\kappa_{(p,t)})$$

$$M_{21} = -\cos(\varphi_{(p,t)})\sin(\kappa_{(p,t)})$$

$$M_{22} = -\sin(\omega_{(p,t)})\sin(\varphi_{(p,t)})\sin(\kappa_{(p,t)}) + \cos(\omega_{(p,t)})\cos(\kappa_{(p,t)})$$

$$M_{23} = \cos(\omega_{(p,t)})\sin(\varphi_{(p,t)})\sin(\kappa_{(p,t)}) + \sin(\omega_{(p,t)})\cos(\kappa_{(p,t)})$$

$$M_{31} = \sin(\varphi_{(p,t)})$$

$$M_{32} = -\sin(\omega_{(p,t)})\cos(\varphi_{(p,t)})$$

$$M_{33} = \cos(\omega_{(p,t)})\cos(\varphi_{(p,t)})$$

Therein, xa and ya are coordinates of a ground control point on the 2D image space; δx and δy are components of lens distortion parameters at x axis and y axis respectively; f is a focal length on imaging; xp and yp are coordinates of a principal point; XA, YA and ZA are corresponding coordinates of the ground control point in the 3D object space; XC, YC and ZC are 3D coordinates of a center of perspectivity; M11 to M33 are elements of a matrix of orientation angles of ω, φ and κ; ω, φ and κ are rotation angles at x axis, y axis and z axis respectively; and p and t are rotation angles of panning and tilting respectively.

(d) Obtaining curve surfaces of EOPs at rotation angles 14: In FIG. 5 to FIG. 10, curve surfaces of the calibrated EOPs at the rotation angles of panning and tilting are obtained through interpolation, where each of the rotation angles of the remotely controlled camera 1 has corresponding EOPs.

The curve surfaces show actual changes of the EOPs following changes of the rotation angles of the remotely controlled camera 1; and accuracies on imaging and measuring are thus achieved. Hence, through the calibrations, when the remotely controlled camera 1 is panning, tilting or zooming, IOPs and EOPs can be obtained for every zooming scale and every rotation angle to maintain good accuracies on imaging and measuring.

The present invention has the following characteristics:

(1) Regarding zooming function of a remotely controlled camera, IOPs (comprising coordinates of a principal point and lens distortion parameters) are changed accordingly. Therefore, the present invention calibrates the IOPs of the remotely controlled camera at different zoom scales and builds a relation between IOPs and the zoom scales.

(2) Since detail geometric structure of the remotely controlled camera is not fully revealed, EOPs (comprising position coordinates and corresponding orientations) are calibrated through interpolation following changes of different rotation angles at different rotation axes; and curve surfaces of the EOPs are thus obtained for easily and quickly obtaining EOPs at each rotation angle.

After the above two calibrations, the remotely controlled camera can pan, tilt and zoom with improved accuracies on imaging and measuring; and, thus, the present invention has wide applications.

To sum up, the present invention is a method of calibrating interior and exterior orientation parameters for a remotely controlled camera, where every zoom scale at every rotation angle has its corresponding IOPs and EOPs to obtain accuracies on imaging and measuring; and, thus, the present invention has wide applications.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of calibrating interior and exterior orientation parameters for a remotely controlled camera, comprising steps of:
    (a) obtaining all images of an object in a 3-dimensional (3D) object space on 2-dimensional (2D) image spaces through perspective projection by a camera at a fixed rotation angle; and combining coordinates of ground control points on said 2D image spaces and corresponding coordinates of said ground control points in said 3D object space to calibrate interior orientation parameters (IOP) as additional parameters at different zoom scales by solving first collinearity equations through self calibration bundle adjustment;
    (b) obtaining polynomial corresponding equations with said calibrated IOPs at said different zoom scales where each of said zoom scales of said camera has corresponding IOPs;
    (c) combining with said calibrated IOPs to obtain coordinates of ground control points on 2D image spaces at different rotation angles and corresponding coordinates of said ground control points in a 3D object space at said rotation angles to calibrate exterior orientation parameters (EOP) as additional parameters at said rotation angles by solving second collinearity equations through resection method; and
    (d) obtaining curve surfaces of said calibrated EOPs at said rotation angles through interpolation where each of said rotation angles of said camera has corresponding EOPs.

2. The method according to claim 1,
    wherein said camera is a panoramic camera having functions of panning, tilting and zooming.

3. The method according to claim 1,
    wherein said IOP comprises coordinates of a principal point and corresponding lens distortion parameters.

4. The method according to claim 1,
    wherein said EOP comprises position coordinates and corresponding orientations.

5. The method according to claim 1,
    wherein, in step (a), said first collinearity equations are as follows:

$$x_a - x_p + \delta_x = -f \frac{m_{11}(X_A - X_C) + m_{12}(Y_A - Y_C) + m_{13}(Z_A - Z_C)}{m_{31}(X_A - X_C) + m_{32}(Y_A - Y_C) + m_{33}(Z_A - Z_C)}$$
$$y_a - y_p + \delta_y = -f \frac{m_{21}(X_A - X_C) + m_{22}(Y_A - Y_C) + m_{23}(Z_A - Z_C)}{m_{31}(X_A - X_C) + m_{32}(Y_A - Y_C) + m_{33}(Z_A - Z_C)};$$

wherein $x_a$ and $y_a$ are coordinates of a ground control point on said 2D image space;
wherein $\delta_x$ and $\delta_y$ are components of lens distortion parameters at x axis and y axis respectively;
wherein f is a focal length on imaging;
wherein $x_p$ and $y_p$ are coordinates of a principal point;
wherein $X_A$, $Y_A$ and $Z_A$ are corresponding coordinates of said ground control point in said 3D object space;
wherein $X_C$, $Y_C$ and $Z_C$ are 3D coordinates of a center of perspectivity;
wherein $m_{11}$ to $m_{33}$ are elements of a matrix of orientation angles of $\omega$, $\phi$ and $\kappa$; and
wherein $\omega$, $\phi$ and $\kappa$ are rotation angles at x axis, y axis and z axis respectively.

6. The method according to claim 5,
    wherein said principal point is a cross point of a collimation line and a 2D image space.

7. The method according to claim 5,
    wherein $\delta_x$ and $\delta_y$ are obtained through the following equations:

$$\begin{cases} \delta_x = x_a(k_1 r^2 + k_2 r^4) \\ \delta_y = y_a(k_1 r^2 + k_2 r^4) \end{cases}$$
$$r = \sqrt{(x_a - x_p)^2 + (y_a - y_p)^2} ;$$

wherein $k_1$ and $k_2$ are said lens distortion parameters; and
wherein $x_p$, $y_p$, $k_1$ and $k_2$ are IOPs.

8. The method according to claim 1,
    wherein, in step (b), said polynomial corresponding equations are as follows:

$$\begin{cases} f = a_1 + a_2 \times \text{zoom} + a_3 \times \text{zoom}^2 + \ldots \\ x_p = b_1 + b_2 \times \text{zoom} + b_3 \times \text{zoom}^2 + \ldots \\ y_p = c_1 + c_2 \times \text{zoom} + c_3 \times \text{zoom}^2 + \ldots \\ k_1 = d_1 + d_2 \times \text{zoom} + d_3 \times \text{zoom}^2 + \ldots \\ k_2 = e_1 + e_2 \times \text{zoom} + e_3 \times \text{zoom}^2 + \ldots ; \end{cases}$$

wherein f is a focal length;
wherein $x_p$ and $y_p$ are coordinates of a principal point;
wherein said principal point is a cross point of a collimation line and a 2D image space;
wherein $k_1$ and $k_2$ are lens distortion parameters;
wherein a to e are coefficients of said equations; and
wherein zoom is a zoom scale.

9. The method according to claim 1,
    wherein, in step (c), said second collinearity equations are as follows:

$$x_a - x_p + \delta_x = -f \frac{M_{11}(X_A - X_{C(p,t)}) + M_{12}(Y_A - Y_{C(p,t)}) + M_{13}(Z_A - Z_{C(p,t)})}{M_{31}(X_A - X_{C(p,t)}) + M_{32}(Y_A - Y_{C(p,t)}) + M_{33}(Z_A - Z_{C(p,t)})}$$

$$y_a - y_p + \delta_y = -f \frac{M_{21}(X_A - X_{C(p,t)}) + M_{22}(Y_A - Y_C) + M_{23}(Z_A - Z_{C(p,t)})}{M_{31}(X_A - X_{C(p,t)}) + M_{32}(Y_A - Y_{C(p,t)}) + M_{33}(Z_A - Z_{C(p,t)})};$$

wherein $x_a$ and $y_a$ are coordinates of a ground control point on said 2D image space;
wherein $\delta_x$ and $\delta_y$ are components of lens distortion parameters at x axis and y axis respectively;
wherein f is a focal length on imaging;
wherein $x_p$ and $y_p$ are coordinates of a principal point;
wherein $X_A$, $Y_A$ and $Z_A$ are corresponding coordinates of said ground control point in said 3D object space;

wherein $X_C$, $Y_C$ and $Z_C$ are 3D coordinates of a center of perspecitivity;

wherein $M_{11}$ to $M_{33}$ are elements of a matrix of orientation angles of $\omega$, $\phi$ and $\kappa$;

wherein $\omega$, $\phi$ and $\kappa$ are rotation angles at x axis, y axis and z axis respectively;

wherein p and t are rotation angles of panning and tilting respectively; and wherein $X_C$, $Y_C$, $Z_C$, $\omega$, $\phi$ and $\kappa$ are EOPs.

10. The method according to claim 1, wherein said camera is a remotely controlled camera.

* * * * *